United States Patent
Ohara

(10) Patent No.: US 8,496,035 B2
(45) Date of Patent: Jul. 30, 2013

(54) PNEUMATIC TIRE WITH TREAD HAVING PROTRUDING STRIP PORTION CONNECTED TO PROTRUSION DISPOSED ON SIDEWALL

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 657 days.

(21) Appl. No.: 12/694,300

(22) Filed: Jan. 27, 2010

(65) Prior Publication Data

US 2010/0200135 A1 Aug. 12, 2010

(30) Foreign Application Priority Data

Feb. 6, 2009 (JP) .................. 2009-026322

(51) Int. Cl.
*B60C 11/01* (2006.01)

(52) U.S. Cl.
USPC ............. 152/209.16; 152/209.19; 152/523; 152/DIG. 1

(58) Field of Classification Search
USPC ... 152/209.16, 209.19, 523, DIG. 1; D12/605
See application file for complete search history.

(56) References Cited

U.S. PATENT DOCUMENTS

| | | | | |
|---|---|---|---|---|
| 1,505,233 | A * | 8/1924 | Wolfe ...................... | 152/209.16 |
| 2008/0047642 | A1 | 2/2008 | Ohara et al. | |
| 2008/0210355 | A1 * | 9/2008 | Harvey et al. ............. | 152/209.8 |
| 2010/0043934 | A1 * | 2/2010 | Harvey .................... | 152/209.16 |
| 2010/0147426 | A1 * | 6/2010 | Janesh et al. ............. | 152/209.18 |

FOREIGN PATENT DOCUMENTS

| | | |
|---|---|---|
| JP | 60-118502 | 8/1985 |
| JP | 10-230708 | 9/1998 |
| JP | 2004-291936 | 10/2004 |
| JP | 2008-49751 | 3/2008 |

* cited by examiner

*Primary Examiner* — Steven D Maki
(74) *Attorney, Agent, or Firm* — Fish & Richardson P.C.

(57) ABSTRACT

An object of the present invention is to provide a pneumatic tire excellent in running performance on a rough road. In order to achieve the object, a pneumatic tire comprises a tread surface having a plurality of lug grooves each of which opens to a sidewall, the sidewall includes a plurality of protrusions disposed thereon, wherein each of the lug grooves includes a protruding strip portion disposed on a groove bottom of the lug groove and extending along an extending direction of the lug groove, the protruding strip portion has a start point thereof at an inner side than a ground-contact point in a width direction as viewed from a front side thereof, and extends up to one of the protrusions beyond an open end of the lug groove located at the sidewall side and is connected to the protrusion.

1 Claim, 4 Drawing Sheets

PNEUMATIC TIRE WITH TREAD HAVING PROTRUDING STRIP PORTION CONNECTED TO PROTRUSION DISPOSED ON SIDEWALL

BACKGROUND OF THE INVENTION

1. Field of the Invention

The present invention relates to a pneumatic tire comprising a tread surface that has a plurality of lug grooves opening to sidewall thereof, particularly to a pneumatic tire intended for use for rough road running.

2. Description of the Related Art

Pneumatic tires intended for use for rough road running (so-called, off-road tires) are expected to run not only on flat paved roads and/or unpaved roads but also on rough roads including muddy grounds. Particularly, during driving on a muddy ground, pneumatic tires may be often caught by mud and steering to change a direction may often be lost due to wheel ruts made by the tires themselves. Under such conditions where the direction is hardly changed to a driver's intended direction, a vehicle may unintentionally proceed into an area with a worse condition of road surface state. In a worst case, the tires may be caught by the mud and the vehicle may get stuck, therefore the vehicle may not be able to proceed anymore. In order to prevent such stuck, the tires need to have traction performance not only on the tread surfaces of pneumatic tires but also on the sidewall.

Japanese Unexamined Utility Model Publication No. 60-118502 proposes a pneumatic tire having a plurality of lug grooves. The pneumatic tire is formed with a plurality of protruding strips disposed on the groove bottom of each of the lug grooves; to thereby prevent the lug grooves being filled with mud during running on muddy ground. In addition, Japanese Unexamined Patent Publication No. 10-230708 proposes a pneumatic tire having a plurality of lug grooves, and the bottom surface of which is covered with a mud prevention layer made of an elastic layer having a low hardness. Further, on the surface of the mud prevention layer, a plurality of substantially straight grooves are disposed with a predetermined distances in a longitudinal direction of the lug groove; to thereby prevent the lug grooves from being filled with mud during running on a muddy ground. However, any of the above pneumatic tires fails to provide satisfactory removing performance of mud caught in the lug grooves, and accordingly, the tread surface does not satisfactorily perform the traction performance. Additionally, in the above pneumatic tires, the sidewall does not provide sufficient traction performance, thereby resulting in a poor running performance on a rough road.

Japanese Unexamined Patent Publication No. 2008-49751 describes a pneumatic tire having a tire surface of a block pattern formed with a plurality of blocks. The pneumatic tire has a plurality of lateral grooves each opened to a ground-contact point in a width direction. The groove bottom of each of the lateral grooves has a protrusion extending along a direction of the lateral groove. As viewed from the front side of the tire, the protrusion has a start point thereof closer to the center than the ground-contact point, and an end point thereof is located at the outer side than the ground-contact point beyond the ground-contact point. In this pneumatic tire, the lug grooves are effectively prevented from being filled with mud; and thus, the traction performance by the tread surface is increased. However, in view of the traction performance by the sidewall, the pneumatic tire still has a room to be further improved in running performance on a rough road.

Japanese Unexamined Patent Publication No. 2004-291936 describes a pneumatic radial tire having a plurality of buttress portions on which a plurality of protrusions of 5 mm or more in height is disposed with a distance in a circumferential direction of the tire. The length of the surface of each of the protrusions in a circumferential direction and the length in a tire diameter direction are larger than the height of the protrusion, and the area increases from the surface to the bottom of the protrusion. The area of the bottom of the protrusion is twice as large as the area of the surface of the protrusion. This pneumatic tire is superior in the traction performance by the sidewall. However, in view of the removing performance of mud caught in the lug grooves, there still is a room for further improvement in running performance on a rough road.

SUMMARY OF THE INVENTION

The present invention has been proposed in view of the aforementioned circumstances. An object of the present invention is to provide a pneumatic tire excellent in running performance on a rough road.

The above-mentioned object can be achieved by the present invention as follows. That is, the present invention provides a pneumatic tire comprising: a tread surface having a plurality of lug grooves each of which opens to a sidewall, wherein the sidewall includes a plurality of protrusions disposed thereon, and each of the lug grooves includes a protruding strip portion disposed on a groove bottom of the lug groove and extending along an extending direction of the lug groove, the protruding strip portion has a start point thereof at an inner side than a ground-contact point in a width direction as viewed from a front side thereof, and extends up to one of the protrusions beyond an open end of the lug groove located at the sidewall side and is connected to the protrusion.

During running on a rough road, the pneumatic tires are caught by muddy ground, and not only the tread surface but also the sidewall thereof come into contact with the ground. However, in the pneumatic tire according to the present invention, the protrusions are disposed on the sidewall. Therefore, even when running on a rough road, the sidewall effectively exerts traction performance. Particularly, even when steering a vehicle to change the direction on a rough road, the protrusions scratch the wall faces of wheel ruts formed by the tires themselves. Thus, the protrusions may function as an element to catch the wall faces of wheel ruts. Therefore, the pneumatic tires increase the steering performance.

Moreover, in the pneumatic tire according to the present invention, each of the lug grooves has a protruding strip portion disposed on each of groove bottoms and extending along an extending direction of the lug groove. As viewed from the front side of the tire, each of the protruding strip portions has a start point thereof at the inner side than the ground-contact point in the width direction. Each of the protruding strip portions is connected to the respective protrusions beyond the open end of the lug groove on the both sidewalls. As described above, in the pneumatic tire according to the present invention, during running on a rough road, the protrusions disposed on the sidewall effectively perform the traction performance. At this time, due to a load resistance of the mud, the protrusions vibrate. In the pneumatic tire according the present invention, since each of the protrusions is connected to the respective protruding strip portions extending along the extending direction of the groove bottom of the lug groove, during running on a rough road, each of the protruding strip portions vibrates synchronously with the respective protrusion. Accordingly, in the pneumatic tire, the mud caught in the lug grooves can be removed swiftly and easily due to the vibration of the protruding strip portions during running on a rough road. Therefore, the lug grooves and the protruding strip portions effectively perform the traction performance. Thus, in the pneumatic tire, the tread surface effectively exerts the traction performance even during running on a rough road. As a result of the traction performance effectively exerted by the sidewall surfaces and the tread surface, the pneumatic tire according to the present invention provides an excellent running performance on a rough road. Note that, in the present invention, the term "width direction" means a width direction of the tire; and the term "circumferential direction" means a circumferential direction of the tire.

In the above pneumatic tire, it is preferred that the protrusion extends continuously in a circumferential direction of the tire. In the case that the protrusion extends continuously in the circumferential direction, the driving force is reliably generated by the protrusion; and thus, direction can be easily changed during running on a rough road. As a result, the above arrangement provides the pneumatic tire excellent running performance on a rough road. Additionally, with this arrangement, the protrusion extending continuously in the circumferential direction comes into contact with the ground during running on a rough road. Therefore, a ground-contact pressure is decentralized; and thus, flotation performance of the tire (anti-sinking performance of the tire) can be increased.

In the above pneumatic tire, it is preferred that the protruding strip portion located at an outer side than the ground-contact point as viewed in the width direction is formed to be higher than the protruding strip portion located at the inner side than the ground-contact point as viewed in the width direction. With such an arrangement, the vibration of the protruding strip portions, which are synchronously generated by the vibration of the protrusions during running on a rough road, are amplified. Therefore, the mud caught in the lug grooves can be swiftly and easily removed during running on a rough road. As a result, this arrangement provides the pneumatic tire more excellent running performance on a rough road.

The present invention also provides a pneumatic tire comprising: a tread surface having a plurality of lug grooves each of which opens to a sidewall, wherein the sidewall includes a plurality of protrusions disposed thereon, and each of the lug grooves includes a protruding strip portion disposed on a groove bottom of the lug groove and extending along an extending direction of the lug groove, the protruding strip portion has a start point thereof at an outer side than a ground-contact point in a width direction as viewed from a front side thereof, and extends up to one of the protrusions beyond an open end of the lug groove located at the sidewall side and is connected to the protrusion.

The pneumatic tire according to the present invention is provided with the protrusions disposed on the sidewall. Therefore, even during running on a rough road, the sidewall effectively exerts the traction performance. Moreover, the pneumatic tire is provided with the protruding strip portions each extending along an extending direction of the respective lug grooves. The protruding strip portion has, as viewed from the front side of the tire, a start point thereof at the outer side than the ground-contact point in the width direction and is connected with the protrusion beyond the open end of the lug groove. When the protrusion and the protruding strip portion are connected to each other as described above, the protruding strip portion vibrates synchronously with the protrusion during running on a rough road. In the above pneumatic tire, the protruding strip portions are not disposed on the groove bottom of the lug grooves at the inner side than the ground-contact point in the width direction. However, the vibration of the protruding strip portions located at the outer side than the ground-contact point in the width direction effectively remove the mud caught in the lug grooves during running on a rough road. Thus, the lug grooves and the protruding strip portions effectively exert the traction performance. Therefore, in the pneumatic tire according to the present invention, the tread surface effectively exerts the traction performance even during running on a rough road. As a result, the sidewall surfaces and the tread surface effectively exert the traction performance. Thus, the pneumatic tire according to the present invention provides an excellent running performance on a rough road.

In the above pneumatic tire, it is preferred that the protrusion extends continuously in a circumferential direction of the tire. In the case that the protrusion extends continuously in the circumferential direction, the protrusion reliably exerts the driving force and direction can be easily changed during running on a rough road. As a result, the above arrangement provides the pneumatic tire an excellent running performance on a rough road, even when the protruding strip portions are not provided on the groove bottom of the respective lug grooves at the inner side than the ground-contact point in the width direction. In addition, with this arrangement, the protrusion continuously extending in the circumferential direction comes into contact with the ground during running on a rough road. Therefore, the ground-contact pressure is decentralized; and thus, the flotation performance of the tire (anti-sinking performance of the tire) is increased.

DETAILED DESCRIPTION OF THE PREFERRED EMBODIMENTS

Figure 1:
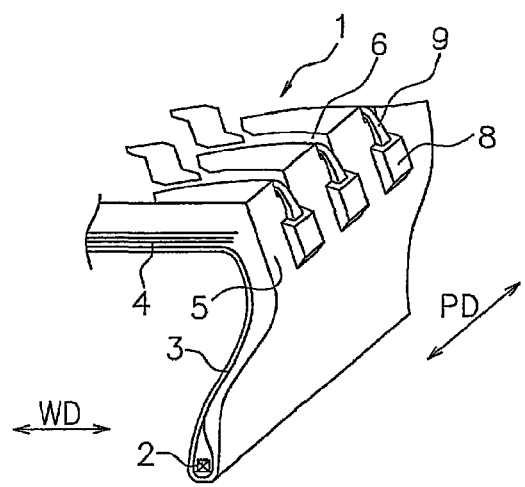
FIG. 1 is a perspective view illustrating an essential portion of an example of a pneumatic tire according to the present invention including a cross section thereof.
Figure 2:
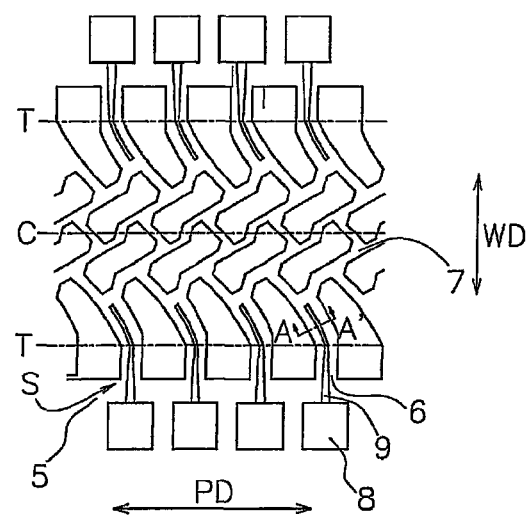
FIG. 2 is a front view illustrating an example of the pneumatic tire according to the present invention.
Figure 3:
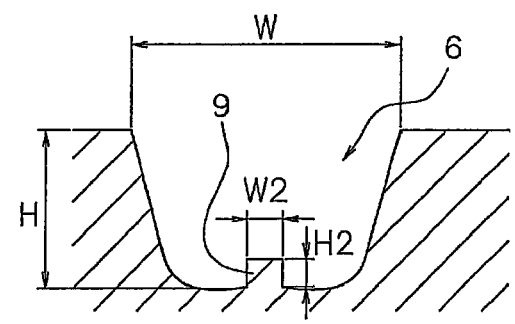
FIG. 3 is a cross sectional view taken along line A-A' as viewed in a direction of arrows in FIG. 2.
Figure 4:
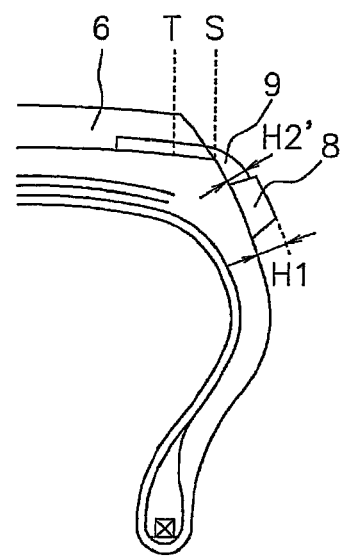
FIG. 4 is a cross sectional view illustrating an example of an essential portion of the pneumatic tire according to the present invention.

Embodiments of the present invention will be described below. FIG. 1 is a perspective view illustrating an essential portion of an example of a pneumatic tire according to the present invention including a cross section thereof. FIG. 2 is a front view illustrating an example of the pneumatic tire according to the present invention. FIG. 3 is a cross sectional view taken along line A-A' as viewed in a direction of arrows in FIG. 2. FIG. 4 is a cross sectional view illustrating an essential portion of an example of the pneumatic tire according to the present invention. In the figures, reference symbol "WD" indicates the width direction of the tire, and reference symbol "PD" indicates the circumferential direction of the tire.

Referring to FIG. 1, the pneumatic tire according to the present embodiment includes a pair of bead cores 2, a carcass 3 having a toroidal shape and winding the bead core 2 therein, and a belt layer 4 disposed at an outer side of a crown section of the carcasses 3 as viewed in a diameter direction of the tire. A tread surface 1 has a plurality of lug grooves 6 extending substantially in the width direction and opened to a sidewall 5.

As shown in FIGS. 1 and 4, the pneumatic tire according to the present invention has a plurality of protrusions 8 disposed on the sidewall 5. With these protrusions 8 on the sidewall 5, the pneumatic tire according to the present invention effectively brings out the traction performance during running even on a rough road. In order to effectively bring out traction performance by the sidewall 5, a protruding height H1 of the protrusion 8 is preferably 3 mm or more. The surface shape of the protrusion 8 is not particularly limited; but for example, a rectangular shape is exemplified. According to the present embodiment, the plurality of the protrusions 8 is regularly disposed at positions corresponding to open ends S of the respective lug grooves 6 in the circumferential direction of the tire. In order to increase the traction performance by the sidewall 5, a distance between the abutting protrusions 8 is preferably 10 to 30 mm as viewed in the circumferential direction of the tire. In addition, when the surface shape of the protrusions 8 has a rectangular shape, the length of the protrusion 8 is preferably 30 to 40 mm as viewed in the circumferential direction of the tire.

As shown in FIGS. 1 and 2, in the pneumatic tire according to the present invention each of the lug grooves 6 is provided with a protruding strip portion 9 extending along a direction of the groove on the bottom of the groove. Each of the protruding strip portions 9 has its start point at the side inner than a ground-contact point T as viewed in the width direction. Each of the protruding strip portions 9 extends beyond the open end S at the sidewall 5 side of the lug groove 6 and connected to the respective protrusions 8. Each of the protruding strip portions 9 is formed to protrude from the bottom of the lug groove 6 and the sidewall 5. As described above, in the pneumatic tire, during running on a rough road, the traction performance is effectively obtained by the protrusions 8 disposed on each of the sidewall 5. At this time, the protrusions 8 vibrate due to a resistance of load such as mud. In this case, in the pneumatic tire, since each of the protrusions 8 and each of the protruding strip portions 9 extending along the extending direction of the bottom of the respective lug grooves 6 are connected to each other, during running on a rough road, the protruding strip portions 9 vibrate along with the protrusions 8. With this arrangement, in the pneumatic tire according to the present invention, during running on a rough road, the mud caught in the lug grooves 6 is removed therefrom swiftly and easily due to the vibration of the protruding strip portions 9; and thus, the traction performance is effectively obtained by the lug grooves 6 and the protruding strip portions 9. Therefore, in the pneumatic tire according to the present invention, even during running on a rough road, the traction performance is effectively obtained on the tread surface 1. Since the traction performance is effectively obtained on the sidewall 5 and the tread surface 1, the pneumatic tire according to the present invention provides excellent running performance on a rough road.

On the other hand, when the protruding strip portion 9 is not connected to the protrusion 8, the following problem may occur during running on a rough road. That is, the protruding strip portions 9 on the sidewall 5 may not withstand the load resistance such as mud. As a result, the vibration may not be satisfactorily transmitted to the protruding strip portions 9 located at the inner side than the ground-contact point T as viewed in the width direction decreasing removing performance of mud caught in the lug grooves 6. Additionally, the protruding strip portions 9 themselves may not withstand the load resistance of mud or the like; and accordingly, the traction performance may not be satisfactorily obtained. Therefore, in the present invention, it is essential to connect each of the protruding strip portions 9 to the respective protrusions 8.

Here is a detailed description about a reason why the present invention increases the removing performance of mud from the lug grooves 6. When the tire rotates, each of the lug grooves 6, the protruding strip portions 9 and the protrusions 8 scratch a soil wall, thereby a catching effect is obtained and thus propulsion is generated. At this time, the lug grooves 6 are filled with compressed mud, and the protruding strip portions 9 are deformed "warping" backward in the rotation direction of the tire. In this state, when the protruding strip portions 9 on the sidewall 5 come out from mud, the mud causing the protruding strip portions 9 to "warp" is peeled off from the tire surface due to the rotation of the tire, and load acting on the protruding strip portions 9 is eliminated. Accordingly, the protruding strip portions 9 recover their original shape. At this time, the protruding strip portions 9 within the lug grooves 6 are also synchronously deformed causing a movement to "pick up" the mud filled in the lug grooves 6 from the inside of the lug grooves 6. Due to adhesion of the mud itself, the mud, which is partially peeled off from the inner wall surface of the lug grooves 6, functions as a core to involve mud therearound, and is peeled off along with surrounding mud while expanding the peel-off area. As a result, the removing performance of mud caught in the lug grooves 6 can be increased.

As described above, in the present invention, each of the protruding strip portions 9 is connected to the respective protrusions 8. When the protruding strip portions 9 and the protrusions 8 are connected to each other, the connected protruding strip portion 9 is restricted by the connected protrusion 8. Due to the restriction force, a stress tends to converge to the connected portion and a crack may be generated thereon. Therefore, in order to reduce the stress convergence at the connected portion, the connected portions between the protruding strip portions 9 and the protrusions 8 are preferably formed so as to have a gentle shape.

In the present embodiment, as viewed in the width direction, the protruding height of the protruding strip portions 9 differs at the inner side and at the outer side from the ground-contact point T as shown in FIG. 2 and FIG. 4. Specifically, the protruding strip portions 9 located at the outer side than the ground-contact point T as viewed in the width direction are formed so as to be higher than the protruding strip portions 9 located at the inner side than the ground-contact point T as viewed in the width direction. Particularly, in the present embodiment, at the outer side from the ground-contact point T as viewed in the width direction, the protruding strip portions 9 are arranged so that the height gradually increases toward the respective protrusions 8. With this arrangement, the magnitude of the vibration of the protruding strip portions 9 generated by the protrusions 8 being synchronized with the vibration thereof is amplified during running on a rough road. Accordingly, the mud caught in the lug grooves 6 is removed swiftly and easily during running on a rough road. As a result, with such an arrangement, the pneumatic tire provides superior running performance on a rough road. Particularly, the protruding strip portions 9 located at the outer side than the ground-contact point T as viewed in the width direction is preferably formed so that the width of the strip portions is wider than that of the protruding strip portions 9 located at the inner side from the ground-contact point T. In this case, the magnitude of vibration of the protruding strip portions 9 generated by the protrusions 8 synchronous with the vibration thereof is preferably amplified during running on a rough road.

As shown in FIG. 3, defining the width of the protruding strip portion 9 located at the inner side than the ground-contact point T as viewed in the width direction as "W2", and defining the width of the lug groove 6 as "W"; the width of the protruding strip portion 9 "W2" is preferably within a range of $\frac{1}{10} \times W \leq W2 \leq \frac{1}{4} \times W$. Moreover, defining the height of the protruding strip portion 9 located at the inner side than the ground-contact point T as "H2", and defining the depth of the lug groove 6 as "H", the height of the protruding strip portion 9 "H2" is preferably set within a range of $\frac{1}{3} \times H \leq H2 \leq \frac{1}{6} \times H$. As viewed in the width direction of the tire, when the width and height of the protruding strip portion 9 located at the inner side than the ground-contact point T is set within the above ranges, the mud caught in the lug grooves 6 is removed swiftly and easily during running on a rough road. The sectional shape of the protruding strip portion 9 is not particularly limited, but a rectangular shape shown in FIG. 3 is exemplified. In the present invention, the width "W" of the lug groove 6 can be set within a range of 20 to 30 mm; and the distance between the lug grooves 6 as viewed in the circumferential direction of the tire can be set within a range of 50 to 70 mm.

As viewed in the width direction, the relation between the width "W2" and the height "H2" of the protruding strip portion 9 located at the inner side than the ground-contact point T is preferably set within a range of $0.7 \leq W2/H2 \leq 1.5$. When W2/H2 is less than 0.7, the rigidity of the protruding strip portions 9 is too low, and the protruding strip portions 9 may not vibrate in the mud caught in the lug grooves 6. On the other hand, when W2/H2 is 1.5 or more, the protruding strip portions 9 may not effectively synchronize with the vibration of the protrusions 8 during running on a rough road.

Moreover, the relation between the height "W2'" and the height "H2'" of the protruding strip portion 9 on the sidewall 5 is preferably set to be W2'/H2'=W2/H2. In this case, the vibration of the protrusions 8 can be effectively prevented from being damped in the half way of the protruding strip portions 9 during running on a rough road.

Further, the relation between the height "H2'" of the protruding strip portion 9 on the sidewall 5 and the height "H1" of the protrusion 8 shown in FIG. 4 is preferably set so as to be $0.5H1 \leq H2$. In this case, the catching effect (traction performance) by the protruding strip portions 9 protruding from the sidewall 5 is further increased. Additionally, when the protruding strip portions 9 are disposed being connected to the respective protrusions 8, the rigidity of the protruding strip portions 9 is ensured. Therefore, the vibration is transmitted to the protruding strip portions 9 disposed in the lug grooves 6, the removing performance of mud caught in the lug grooves 6 is increased. On the other hand, when "H2'" is less than 0.5H1, the rigidity of the protruding strip portions 9 on the sidewall 5 is increased. Therefore, the protruding strip portions 9 hardly warp. As a result, the magnitude of the vibration transmitted to the protruding strip portions 9 disposed in the lug grooves 6 is reduced. The catching effect of the protruding strip portions 9 is also reduced. As a result, the above-described effect of the present invention may not be obtained satisfactorily.

In order to increase the traction performance by the sidewall 5 and the removing performance of mud caught in the lug grooves 6, the protrusions 8 are preferably disposed on the sidewall 5 so that the outer edge thereof in the diameter direction is located at the outer side than the maximum width position of the pneumatic tire as viewed in the width direction.

Figure 5:
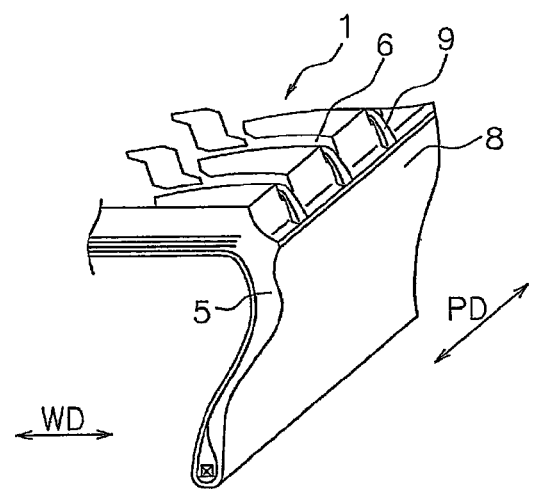
FIG. 5 is a perspective view of an essential portion of another example of a pneumatic tire according to the present invention including a cross section thereof.

Other Embodiments (1) The above-described embodiment has described an example in which the plurality of protrusions 8 is disposed on the sidewall 5 with a distance as viewed in the circumferential direction of the tire. However, the protrusions 8 may extend continuously in a circumferential direction of the tire as shown in FIG. 5. In this case, the protrusions 8 ensure the driving force, and steering is reliably achieved easily during running on a rough road. As a result, with such an arrangement, the pneumatic tire exerts an excellent running performance on a rough road. In this embodiment, the protrusions 8 is arranged so as to be higher than the protruding strip portions 9. Preferably, each of the protruding strip portions 9 gradually increases the protruding height thereof toward the respective protrusions 8 and connected thereto.

Figure 6:
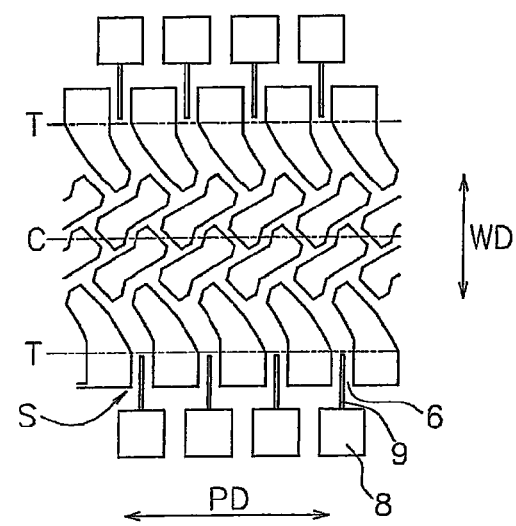
FIG. 6 is a front view of another example of a pneumatic tire according to the present invention.

(2) In the above-described embodiment, as viewed from the front side of the tire, each of the protruding strip portions 9 has a start point at the inner side than the ground-contact point T as viewed in the width direction, and is connected to the respective protrusions 8 beyond the open end S of the lug grooves 6. However, as shown in FIG. 6, each of the protruding strip portions 9 may have the start point thereof at the outer side than the ground-contact point T in the width direction as viewed from the front side of the tire, and may be connected to the respective protrusions 8 beyond the open end S of the lug grooves 6. In this case, in the groove bottom of the lug grooves 6 located at the inner side than the ground-contact point T as viewed in the width direction, the protruding strip portions 9 are not disposed. However, the vibration of the protruding strip portions 9 located at the outer side than the ground-contact point T effectively removes the mud caught in the lug grooves 6 during running on a rough road. With this arrangement, in the pneumatic tire, the tread surface 1 effectively provides the traction performance even during running on a rough road. Since the sidewall 5 and tread surface 1 provide the traction performance effectively, the pneumatic tire according to the embodiment provides an excellent running performance on a rough road.

Note that, in the above-described embodiment, the protrusion 8 may continuously extend in a circumferential direction of the tire. In addition, each of the protruding strip portions 9 may have the start point at the outer side than the ground-contact point T as viewed in the width direction, and may be connected to the respective protrusions 8 beyond the open end S of the lug grooves 6. Also in this case, since the above-described effect is obtained, the pneumatic tire having such an arrangement provides excellent running performance on a rough road.

EXAMPLES

Examples which specifically demonstrate the structure and effect of the present invention will be described below. A performance evaluation of the respective tires was conducted as described below.
(1) Running Performance on Rough Road
Tires (tire size LT265/75R16; each mounted on a standard rim, inner pressure was set in accordance with the TRA standard) were mounted on a four-wheel-drive pickup truck. Three monitors evaluated riding feeling during running on a muddy road. Defining a conventional tire (Comparative Example 1) as 100, the evaluation is indicated using an index. As the value increases, the tire exhibited more satisfactory running performance on a rough road.

(2) Traction Performance

Tires (tire size LT265/75R16; each mounted on a standard rim, inner pressure was set in accordance with the TRA standard) were mounted on a four-wheel-drive pickup truck. Applying a fixed load of 200 kg on a cargo bed, and the vehicle was driven for 200 m on a muddy road to carry out an acceleration test, and required time was measured. Defining the conventional tire (Comparative Example 1) as 100, the evaluation is indicated using an index. As the value increases, the tire exhibited more satisfactory traction performance.

(3) Mud Removing Performance

After completing the above traction performance test, the vehicle was driven for 100 m on a paved road, and the side portions and rims of the tires were cleaned. Then, the weight of the respective tires was measured. Defining the conventional tires (Comparative Example 1) as 100, the evaluation is indicated using an index. As the value increases, the tire exhibited more satisfactory mud removing performance.

(4) Steering Performance

Tires (tire size LT265/75R16; each mounted on a standard rim, inner pressure was set in accordance with the TRA standard) were mounted on a four-wheel-drive pickup truck. The vehicle was driven on a soft muddy closed oval course (road with surface, which is soft to an extent that the rim portion of the tire is not buried in the mud, but the sidewall of the tire is buried in the mud) to form wheel ruts of the vehicle. Applying a fixed load of 200 kg on the cargo bed, the vehicle was driven again along the wheel ruts. The performance to get out the ruts was evaluated as steering performance; three monitors evaluated the feeling. Defining the conventional tires (Comparative Example 1) as 100, the evaluation is indicated using an index. As the value increases, the tire exhibited more satisfactory steering performance.

(5) Flotation Performance

Tires (tire size LT265/75R16; each mounted on a standard rim, inner pressure was set in accordance with the TRA standard) were mounted on a four-wheel-drive pickup truck. A closed oval course was prepared on an excessive soft muddy road (road surface soft to an extent that roughly a half of the rims of the tires is buried in the mud). Applying a fixed load of 200 kg on the cargo bed, the vehicle was driven on the muddy road, and three monitors evaluated the riding feeling during running on the muddy road. Defining the conventional tires (Comparative Example 1) as 100, the evaluation is indicated using an index. As the value increases, the tire exhibited more satisfactory steering performance.

Comparative Example 1

Figure 7:
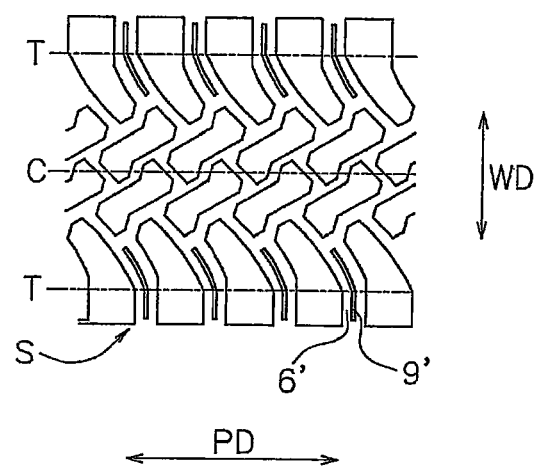
FIG. 7 is a front view of a pneumatic tire of Comparative Example 1.

Pneumatic tires (width W of the lug groove: 25 mm, depth H of the lug groove: 15 mm, width of the W2 the protruding strip portion: 3 mm, height H2 of the protruding strip portion: 3 mm) were prepared. As viewed from the front side of the tire, each of the pneumatic tires has a protruding strip portion 9', which has a start point at the inner side than the ground-contact point T and an end point thereof at the inner side than the open end S of the lug groove beyond the ground-contact point T disposed at the bottom of the lug groove 6', as viewed in the width direction, as shown in FIG. 7. The above-described evaluation test was carried out using such a pneumatic tire. The test result is shown in Table 1.

Example 1

Pneumatic tires, which have a structure shown in FIGS. 1 to 4 (width W of the lug groove 6: 25 mm, depth H of the lug groove 6: 15 mm, width W2 of the protruding strip portion 9: 3 mm, height H2 of the protruding strip portions 9: 3 mm, height H1 of the protrusion 8: 5 mm), were prepared. The above-described evaluation test was carried out using such a pneumatic tire. The test result is shown in Table 1.

Example 2

Pneumatic tires with structures identical to those of Example 1 except a point that the protrusions 8 continuously extend in the circumferential direction of the tire were prepared as shown in FIG. 5. The above-described evaluation test was carried out using such a pneumatic tire. The test result is shown in Table 1.

TABLE 1

|  | Comparative Example 1 | Example 1 | Example 2 |
|---|---|---|---|
| Running performance on rough road | 100 | 113 | 109 |
| Traction performance | 100 | 112 | 104 |
| Mud removing performance | 100 | 120 | 113 |
| Steering performance | 100 | 107 | 110 |
| Flotation performance | 100 | 95 | 115 |

The test result shown in Table 1 demonstrates that, compared to the pneumatic tires of Comparative Example 1, in the pneumatic tires of Example 1 and Example 2, the running performance on a rough road is remarkably increased. In addition, the traction performance, the mud removing performance, the steering performance and the flotation performance are increased. Particularly, in the pneumatic tires of Example 2, which have protrusions 8 continuously extending in the circumferential direction of the tire disposed on the sidewall 5, the flotation performance is remarkably increased.

What is claimed is:

1. A pneumatic tire comprising:
 a tread surface having a plurality of lug grooves each of which opens to a sidewall, wherein
 the sidewall includes a plurality of protrusions disposed thereon, and each of the lug grooves includes a protruding strip portion disposed on a groove bottom of the lug groove and extending along an extending direction of the lug groove,
 the protruding strip portion has a start point thereof at an inner side of a ground-contact point in a width direction as viewed from a front side thereof, and extends up to one of the protrusions beyond an open end of the lug groove located at the sidewall side and is connected to the protrusion, wherein the protruding strip portion located at an outer side of the ground-contact point as viewed in the width direction is formed to be higher than the protruding strip portion located at the inner side of the ground-contact point as viewed in the width direction.

* * * * *